(12) United States Patent
Watanabe

(10) Patent No.: US 6,188,516 B1
(45) Date of Patent: Feb. 13, 2001

(54) WIDE-VIEW TELESCOPIC OPTICAL SYSTEM

(75) Inventor: Naomi Watanabe, Urawa (JP)

(73) Assignee: Kamakura Koki Kabushiki Kaisha, Saitama-ken (JP)

( * ) Notice: Under 35 U.S.C. 154(b), the term of this patent shall be extended for 0 days.

(21) Appl. No.: 09/196,637

(22) Filed: Nov. 19, 1998

(30) Foreign Application Priority Data

Nov. 25, 1997 (JP) ................................................ 9-010432 U
Jan. 27, 1998 (JP) ............................................ 10-000200 U

(51) Int. Cl.$^7$ .................................................. G02B 23/02
(52) U.S. Cl. .......................... 359/431; 359/399; 359/434; 359/407
(58) Field of Search ..................... 359/431, 434, 359/423, 424, 407–418, 835, 836, 399, 402

(56) References Cited

U.S. PATENT DOCUMENTS

| 715,793 | * | 12/1902 | Harvey | 359/431 |
| 788,823 | * | 5/1905 | Dieckmann | 359/418 |
| 5,684,635 | * | 11/1997 | Sugawara | 359/643 |
| 5,812,324 | * | 9/1998 | Fukumoto | 359/643 |

FOREIGN PATENT DOCUMENTS

| 11633 | * | 4/1914 | (GB) | 359/835 |
| 847316 | * | 9/1960 | (GB) | 359/413 |

* cited by examiner

Primary Examiner—Jon Henry
(74) Attorney, Agent, or Firm—Christensen O'Connor Johnson Kindness PLLC

(57) ABSTRACT

A lightweight and small-sized high-power monocular, or binoculars, including a wide-view telescopic optical system to have a wide view and a bright field of view is provided. The wide-view telescopic optical system includes a reverse reflection optical system interposed between an objective lens system and an eye lens system. The reverse reflection optical system includes a first reflector arranged at an angle of 45 degrees to an incident optical axis. The reverse reflection optical system also includes a right-angled isosceles triangle prism having roof surfaces whose ridge line is laid on an axis parallel with the incident optical axis so as to receive a reflected light from the first reflector at a part of an oblique side surface of the prism. The reverse reflection optical system further includes a second reflector arranged to oppose another part of the oblique side surface of the right-angled isosceles triangle prism from which light reflected by the prism is emitted. The second reflector is placed at an angle of 45 degrees with respect to the optical axis of reflected light emitted from the prism. The wide-view telescopic optical system also includes a relay lens located between the objective lens system and the eye lens system at a position adjacent the second reflector.

2 Claims, 3 Drawing Sheets

WIDE-VIEW TELESCOPIC OPTICAL SYSTEM

FIELD OF THE INVENTION

The present invention relates to an observing unit incorporating a telescopic optical system having a wide view and a bright field of view and, in particular, to a monocular or binoculars having a reverse reflection type of optical system between an objective lens system and an eye lens system.

BACKGROUND OF THE INVENTION

In watching sports, such as soccer or rugby, which are played in a large playground by players who move quickly, or in watching a play in a theater having a laterally extending stage, it is desirable to use a monocular or binoculars having a wide view.

As to an observing unit incorporating a telescopic optical system to be used for these purposes, a type of binoculars called "opera glasses" has been widely used. Opera glasses are formed of the Galileo optical system, as known in the art, which uses a convergent lens as an objective lens and a divergent lens as an eye lens. The Galileo optical system advantageously allows opera glasses to be small in size and lightweight to be used conveniently, but results in opera glasses having a relatively narrow view, a dark field of view, and a low power.

On the other hand, a high-power observing unit incorporating a telescopic optical system includes a reverse reflection optical system, which is composed of two or three prisms placed between an objective lens and an eye lens. The overall optical system of such an observing unit is complicated. Thus, although this type of an observing unit may have a power of up to seven magnifications, its actual view tends to be narrow, for example, less than 10 degrees. Accordingly, this type of observing unit has not been adequate for observing an object that moves quickly.

In an observing unit incorporating a telescopic optical system, such as binoculars having a high power, a reverse reflection optical system has been the hindrance to obtain a wide view. Accordingly, the overall design of a telescopic optical system itself has been the key to obtaining a wide view. As a result, the arrangement of a telescopic optical system has become complicated, greatly increasing the weight, size, and cost of the observing unit that incorporates such a telescopic optical system, and further negatively affecting its portability and manipulatability.

In general, although an antinomic condition that the higher the power, the narrower the view cannot be avoided in principle, it is known in the art that using an objective lens having a minimum focal distance is preferable in obtaining a wide view. On the other hand, if a reverse reflection optical system composed of two or three prisms is incorporated in an image-erecting optical system, an objective lens should have a focal distance that takes into consideration the optical path length of these prisms. Accordingly, the overall optical system becomes bulky in proportion to the size of the prisms. This makes it difficult to form compact and, thus, portable observing units. Further, the size of a reverse reflection optical system comprising a couple of prisms determines the size of an objective lens to be used.

A need exists for a compact monocular or binoculars having a wide view, a bright field of view, and a high power.

SUMMARY OF THE INVENTION

The present invention provides an arrangement in which a reverse reflection optical system is interposed between an objective lens system and an eye lens system. The reverse reflection optical system includes a first reflector arranged at an angle of 45 degrees to an incident optical axis. The reverse reflection optical system also includes a right-angled isosceles triangle prism having roof surfaces whose ridge line is laid on an axis parallel with the incident optical axis so as to receive reflected light from the first reflector at a part of an oblique side surface of the prism. The reverse reflection optical system also includes a second reflector arranged to face another part of the oblique side surface of the prism so as to be at an angle of 45 degrees with respect to a reflecting optical axis of the light reflected from the prism. A relay lens is arranged between the objective lens system and the eye lens system adjacent the second reflector of the reverse reflection optical system.

In one aspect of the present invention, in order to effectively attain the object of the present invention, a meniscus lens is used as the relay lens arranged between the objective lens system and the eye lens system. The convex surface of the meniscus lens is arranged so as to face an incident side. A portion of the meniscus lens is located within a projection area projected by the second reflector on a horizontal plane that includes the incident optical axis.

With this arrangement, it is possible to provide a monocular or binoculars having a wide view and a bright field of view, while maintaining a high power.

BRIEF DESCRIPTION OF THE DRAWINGS

The foregoing aspects and many of the attendant advantages of this invention will become more readily appreciated by reference to the following detailed description, when taken in conjunction with the accompanying drawings, wherein.

DETAILED DESCRIPTION OF THE PREFERRED EMBODIMENT

Figure 1:
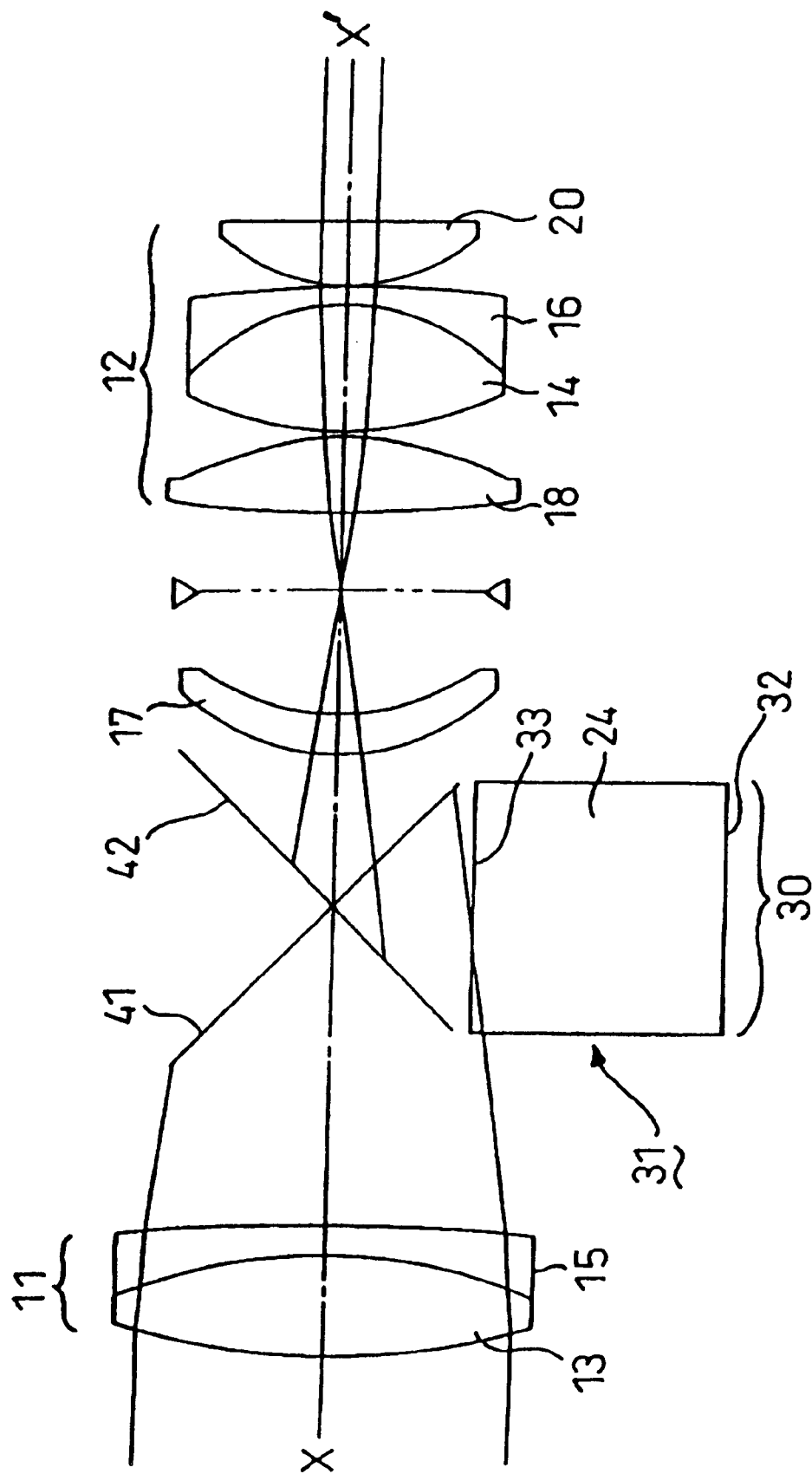
FIG. 1 is a view illustrating an embodiment of a wide-view telescopic optical system according to the present invention.

Referring to FIG. 1, an objective lens system 11 in this embodiment is formed of a compound convergent lens, in which a biconvex convergent lens 13 and a meniscus divergent lens 15 are mated together. An eye lens system 12 is composed of a group of lenses consisting of a biconvex convergent lens 14 and a meniscus divergent lens 16 mated to the rear side of the biconvex convergent lens 14 so as to form a compound convergent lens, an aspherical biconvex convergent lens 18 arranged in front of the compound convergent lens, and a flat-convex convergent lens 20 arranged in the rear of the compound convergent lens and having a convex surface facing an incident side. A relay lens 17 is interposed between the objective lens system 11 and the eye lens system 12, which is composed of a meniscus convergent lens having a convex surface facing the incident side.

A reverse reflection optical system is generally denoted by reference numeral 30, and is interposed between the objective lens system 11 and the eye lens system 12 in order to visualize an erect image for a monocular or binoculars. When the relay lens 17 interposed between the objective lens system 11 and the eye lens system 12 is a convergent lens, providing the relay lens 17 closer to the objective lens system 11 generally widens the field of view.

Thus, the relay lens 17 is located at a position that is as close as possible to the reverse reflection optical system 30 interposed between the objective lens system 11 and the eye lens system 12. As more fully described below, in order to place the relay lens 17 as close as possible to the reverse reflection optical system 30, the reverse reflection optical system 30 is composed of a first reflector 41 arranged at an angle of 45 degrees to an incident optical axis X-X', a single right-angled isosceles triangle prism 31, and a second reflector 42 arranged at an angle of 135 degrees to the incident optical axis X-X'. That is, the second reflector 42 is arranged at an angle of 45 degrees to the optical axis of reflected light emitted from the right-angled isosceles triangle prism 31. Since the first reflector 41 is arranged at an angle of 45 degrees to the incident optical axis X-X', incident light along the incident optical axis X-X' is reflected by the first reflector 41 in a direction orthogonal to the incident optical axis X-X'. The reflected light is introduced to an oblique side surface (a plane including an oblique side of a right-angled isosceles triangle) of the single right-angled isosceles triangle prism 31 having an incident surface orthogonal to the optical axis of the reflected light.

Figure 2:
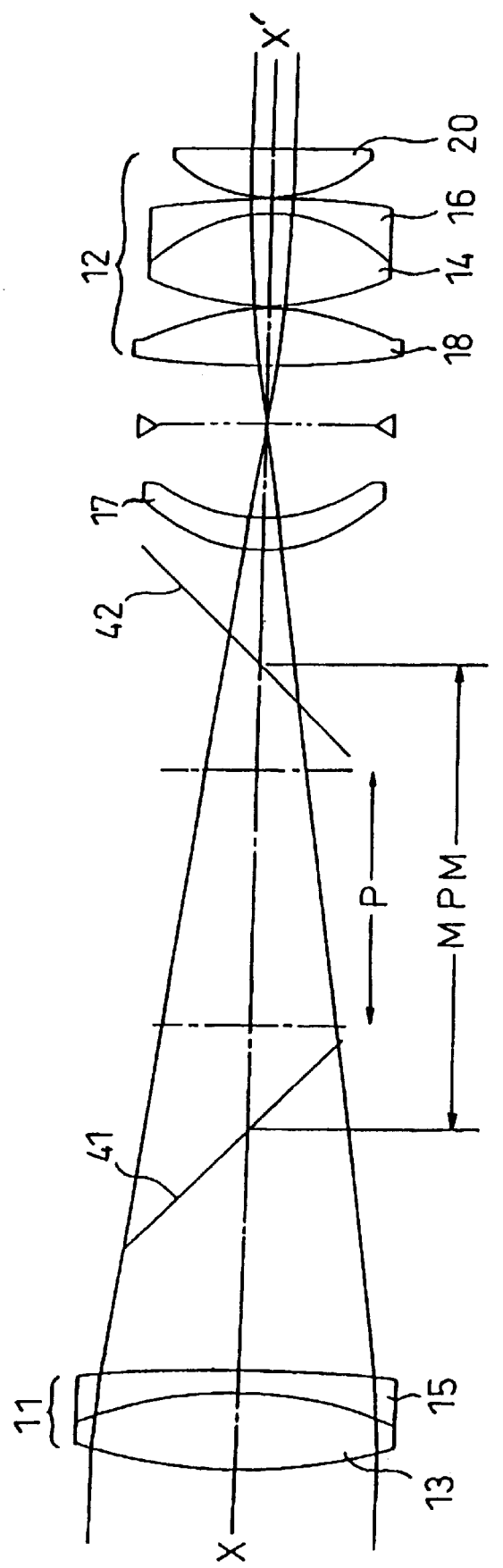
FIG. 2 is an exploded view illustrating the wide-view telescopic optical system in the embodiment shown in FIG. 1.
Figure 4:
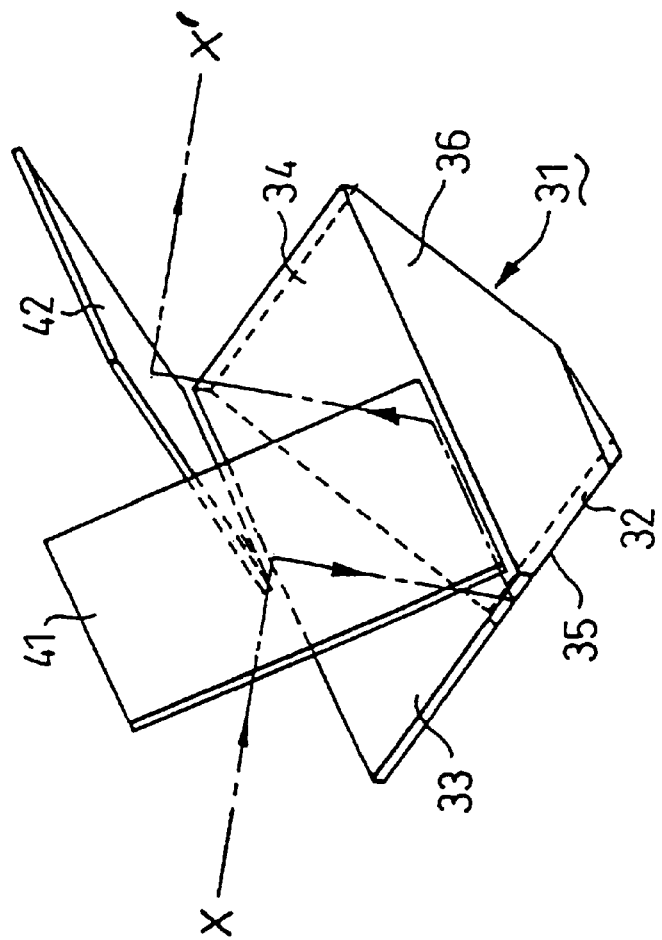
FIG. 4 is a perspective view illustrating the reverse reflection optical system forming the wide-view telescopic optical system of FIG. 1.

Referring to FIG. 2, which is an exploded view of the telescopic optical system described above, an area MPM denotes an optical path length on an optical axis required by the reverse reflection optical system. An area P denotes an optical path length on an optical axis required by the right-angled isosceles triangle prism used in the reverse reflection optical system.

Figure 3:
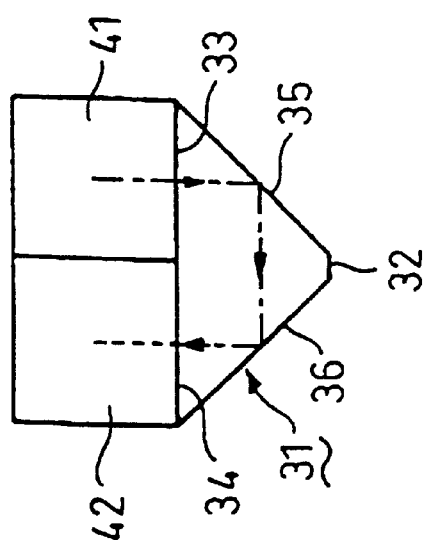
FIG. 3 is a front view of a reverse reflection optical system, used to form the wide-view telescopic optical system of FIG. 1.

Referring to FIG. 3, the oblique side surface of the right-angled isosceles triangle prism 31 serves at its one side as an incident surface 33 for introducing the reflected light from the first reflector 41, and at its other side as an emergent surface 34 for emitting the light reflected in the prism 31.

The right-angled isosceles triangle prism 31 includes a ridge line 32 and roof surfaces 35 and 36 extending therefrom on the opposite sides. One of the roof surfaces serves as a first reflecting surface 35 for reflecting the light introduced into the prism 31, and the other roof surface serves as a second reflecting surface 36 for reflecting the light reflected from the first reflecting surface 35.

Light on an optical axis reflected from the second reflecting surface 36 is emitted from the emergent surface 34 of the prism 31 in a direction perpendicular to the emergent surface 34, and is further reflected by the second reflector 42, which faces the emergent surface 34, so as to be directed toward the relay lens 17 along the optical axis X-X'.

As described above, the light on the optical axis X-X' that reaches the reverse reflection optical system 30 passes via the reflecting surfaces presented by the first reflector 41, the right-angled isosceles triangle prism 31, and the second reflector 42. The light is then emitted toward the eye lens system 12 along the optical axis X-X'. During this period, an external image is reversed so as to obtain an erect image. Accordingly, in the present invention, the final reflecting surface facing the relay lens 17 and the eye lens system 12 is provided by the second reflector 42 and, thus, the relay lens 17 is opposed to the second reflector 42 for refracting the light reflected from the second reflector 42. Therefore, the relay lens 17 can be displaced forward up to a position just before a position where the relay lens comes in contact with the second reflector 42. In particular, if the relay lens 17 is formed of a meniscus convergent lens having a convex surface facing the incident side and a concave surface facing an emergent side, the relay lens 17 can be moved to a position just before a position where its peripheral edge comes in contact with the second reflector 42. In this arrangement, it is possible to move the relay lens 17 to a position where the convex surface of the relay lens 17 enters a projection area cast by the second reflector 42 on a horizontal plane that includes the optical axis X-X'. Thus, by allowing the relay lens 17 to approach the second reflector 42 as close as possible, a monocular or binoculars incorporating the present arrangement can have a wider and brighter field of view than conventional monocular or binoculars having the same power as the monocular or binoculars of the present invention.

In order to reversely reflect convergent external light incident from the objective lens system, according to a reverse reflection optical system of the present invention, a reflector is used as a first reflecting surface, and the incident light is guided to a final reflecting surface by a single right-angled triangle prism. Accordingly, the relay lens can be moved to a position extremely close to a reflector used as the final reflecting surface. This arrangement makes it possible to obtain a wide view and a bright field of view. Further, since a single prism is used, the overall optical system can be lightweight so as to greatly enhance the portability and manipulatability of a monocular or binoculars.

While the preferred embodiments of the invention have been illustrated and described, it will be appreciated that various changes can be made therein without departing from the spirit and scope of the invention.

The embodiments of the invention in which an exclusive property or privilege is claimed are defined as follows:

1. A wide-view monocular telescopic optical system in which a reverse reflection optical system is interposed between an objective lens system and an eye lens system, the reverse reflection optical system comprising:

a first reflector arranged so as to be at an angle of 45 degrees to an incident optical axis;

a right-angled isosceles triangle prism having roof surfaces whose ridge line is laid on an axis parallel with the incident optical axis so as to receive light reflected by the first reflector at a part of an oblique side surface of the prism; and a second reflector arranged to oppose another part of the oblique side surface of the right-angled isosceles triangle prism from which a reflected light emits, the second reflector being at an angle of 45 degrees to the reflected light axis, the wide-view monocular telescopic optical system further comprising a meniscus relay lens arranged between the objective lens system and the eye lens system, a convex surface of the meniscus lens facing an incident side, a portion of the meniscus lens being positioned within a projection area projected by the second reflector on a horizontal plane that includes the incident optical axis.

2. A wide-view binocular telescopic optical system in which a reverse reflection optical system is interposed between an objective lens system and an eye lens system, the reverse reflection optical system comprising:

a first reflector arranged so as to be at an angle of 45 degrees to an incident optical axis;

a right-angled isosceles triangle prism having roof surfaces whose ridge line is laid on an axis parallel with the incident optical axis so as to receive light reflected by the first reflector at a part of an oblique side surface of the prism;

a second reflector arranged to oppose another part of the oblique side surface of the right-angled isosceles triangle prism from which a reflected light emits, the second reflector being at an angle of 45 degrees to the reflected light axis, the wide-view binocular telescopic optical system further comprising a meniscus relay lens arranged between the objective lens system and the eye lens system, a convex surface of the meniscus relay lens facing an incident side, a portion of the meniscus lens being positioned within a projection area projected by the second reflector on a horizontal plane that includes the incident optical axis.

* * * * *